US010377900B2

(12) United States Patent
Mouazen et al.

(10) Patent No.: US 10,377,900 B2
(45) Date of Patent: Aug. 13, 2019

(54) BITUMEN/POLYMER COMPOSITION HAVING IMPROVED LOW-TEMPERATURE MECHANICAL PROPERTIES

(71) Applicant: TOTAL MARKETING SERVICES, Puteaux (FR)

(72) Inventors: Mouhamad Mouazen, Lyons (FR); Romuald Botel, Chonas l'Amballan (FR); Carole Ruot, Irigny (FR); Julien Chaminand, Vaulx en Velin (FR); Nour Dridi, Gringy (FR)

(73) Assignee: TOTAL MARKETING SERVICES, Puteaux (FR)

( * ) Notice: Subject to any disclaimer, the term of this patent is extended or adjusted under 35 U.S.C. 154(b) by 153 days.

(21) Appl. No.: 15/036,903

(22) PCT Filed: Nov. 13, 2014

(86) PCT No.: PCT/EP2014/074511
§ 371 (c)(1),
(2) Date: May 16, 2016

(87) PCT Pub. No.: WO2015/071370
PCT Pub. Date: May 21, 2015

(65) Prior Publication Data
US 2016/0280919 A1 Sep. 29, 2016

(30) Foreign Application Priority Data
Nov. 14, 2013 (FR) ...................................... 13 61153

(51) Int. Cl.
| C08L 95/00 | (2006.01) |
| C08L 23/04 | (2006.01) |
| C08K 3/06 | (2006.01) |
| C08J 3/00 | (2006.01) |
| C09D 195/00 | (2006.01) |
| C08L 53/02 | (2006.01) |

(52) U.S. Cl.
CPC .............. *C08L 95/00* (2013.01); *C08J 3/005* (2013.01); *C08K 3/06* (2013.01); *C08L 23/04* (2013.01); *C09D 195/00* (2013.01); *C08J 2395/00* (2013.01); *C08J 2433/14* (2013.01); *C08J 2453/02* (2013.01); *C08L 53/02* (2013.01); *C08L 2555/20* (2013.01); *C08L 2555/52* (2013.01); *C08L 2555/54* (2013.01)

(58) Field of Classification Search
None
See application file for complete search history.

(56) References Cited

U.S. PATENT DOCUMENTS

| 4,145,322 | A | 3/1979 | Maldonado et al. |
| 4,242,246 | A | 12/1980 | Maldonado et al. |
| 4,554,313 | A | 11/1985 | Hagenbach et al. |
| 4,567,222 | A | 1/1986 | Hagenbach et al. |
| 5,120,777 | A | 6/1992 | Chaverot et al. |
| 6,011,094 | A | 1/2000 | Planche et al. |
| 6,011,095 | A * | 1/2000 | Planche ................. C08K 3/00 523/351 |
| 9,150,707 | B2 | 10/2015 | Schroeder |
| 2010/0197835 | A1 | 8/2010 | Chaverot et al. |
| 2012/0123028 | A1 | 5/2012 | Dreesen et al. |
| 2014/0024735 | A1 | 1/2014 | Harders et al. |

FOREIGN PATENT DOCUMENTS

| AU | 628390 B2 | 9/1992 |
| EP | 0 360 656 A1 | 3/1990 |
| EP | 0 409 683 A1 | 1/1991 |
| EP | 0 739 386 B1 | 8/1999 |
| FR | 2 376 188 A1 | 7/1978 |
| FR | 2 429 241 A1 | 1/1980 |
| FR | 2 528 439 A1 | 12/1983 |
| JP | 58015555 A * | 7/1981 |
| JP | 58015555 A * | 1/1983 |
| RU | 2479592 C2 | 4/2013 |
| WO | 97/43342 A1 | 11/1997 |
| WO | 2011/013073 A1 | 2/2011 |
| WO | 2012/0107460 A1 | 8/2012 |
| WO | 2013/092531 A1 | 6/2013 |

OTHER PUBLICATIONS

Keyf, "The Modification of Bitumen with Reactive Ethylene Terpolymer, Styrene Butadiene Styrene and Variable Amounts of Ethylene Vinyl Acetate," Research on Chemical Intermediates, DOI: 10.1007/s11164-013-1287-9, XP055126286, pp. 1-13, Jun. 6, 2013.
Feb. 17, 2015 Written Opinion issued in International Application No. PCT/EP2014/074511.
Feb. 17, 2015 International Search Report issued in International Application No. PCT/EP2014/074511.

* cited by examiner

Primary Examiner — Randy P Gulakowski
Assistant Examiner — Ha S Nguyen
(74) *Attorney, Agent, or Firm* — Oliff PLC

(57) ABSTRACT

The invention relates to a bitumen/polymer composition and to its process of manufacture. The bitumen/polymer composition includes first bitumen base having an intrinsic stability S of greater than 2.5 and/or a degree of peptization $S_a$ of greater than 0.60, and a second bitumen base having an intrinsic stability S of less than or equal to 2.50 and/or a degree of peptization $S_a$ of less than or equal to 0.60, an elastomer and an olefinic polymer adjuvant functionalized by at least glycidyl functional groups. The values of intrinsic stability S and of the degree of peptization $S_a$ are measured according to the standard ASTM D 7157-12. The bitumen/polymer composition exhibits improved low-temperature mechanical properties.

13 Claims, No Drawings

BITUMEN/POLYMER COMPOSITION HAVING IMPROVED LOW-TEMPERATURE MECHANICAL PROPERTIES

TECHNICAL FIELD

The present invention belongs to the field of bitumens. More specifically, it relates to bitumen/polymer compositions having improved low-temperature mechanical properties.

The invention also relates to the use of these compositions in the fields of road applications, in particular in the manufacture of road binders, such as hot bituminous mixes, cold bituminous mixes or surface coatings, and in the fields of industrial applications, for example in the manufacture of internal and external coatings.

PRIOR ART

Numerous studies have related to the improvement in the mechanical, elastic and/or rheological properties of bituminous compositions. Bitumen/polymer compositions exhibiting improved properties and also their process of preparation have been widely described in the literature.

Among the polymers added to bitumens, random or block copolymers of styrene and of a conjugated diene and in particular of styrene and butadiene and of styrene and isoprene are known to be particularly effective as they mix very easily in bitumens and confer on them excellent mechanical and dynamic properties and in particular very good viscoelasticity properties.

In addition, it is known that the stability of the bitumen/polymer compositions can be improved by chemical coupling of the polymer to the bitumen. This chemical coupling, conventionally carried out by crosslinking of the polymer, makes it possible in addition to broaden the range of use of the bitumen/polymer compositions. Mention may be made of the documents FR 2 376 188, FR 2 429 241, FR 2 528 439 and EP 0 360 656 as example of a process involving a random or block copolymer of styrene and of a conjugated diene crosslinked with sulfur. The document FR 2 528 439 relates in particular to crosslinking with a polysulfide. The document EP 0 360 656 describes the use of a sulfur-donating vulcanization accelerator used alone or in combination with chemically non-bonded sulfur and/or a polysulfide or a non-sulfur-donating vulcanization accelerator.

These bitumen/polymer compositions are used in the preparation of binders for various surface coatings and in particular as road surface coatings, provided that these compositions exhibit, in combination, a certain number of mechanical and/or dynamic characteristics. Optimized mechanical characteristics, such as the low-temperature mechanical properties, are in particular crucial for applications in road surfacings.

The patent EP 0 739 386 describes bitumen/polymer compositions comprising an elastomer and a specific functionalized polyolefin. The authors showed that such a combination makes it possible to improve the consistency, the thermal susceptibility and the tensile mechanical properties of the bitumen/crosslinked polymer compositions.

In the context of its studies, the applicant company has been interested in improving the low-temperature mechanical properties of bitumen/polymer compositions, preferably bitumen/crosslinked polymer compositions, without damaging the other mechanical properties, in particular the consistency.

The present invention is targeted at obtaining bitumen/polymer compositions exhibiting properties of resistance to cracking, in particular a Fraass breaking point according to the standard EN 12593 of less than or equal to $-11°$ C., more preferably of less than or equal to $-13°$ C.

Another objective of the invention is to improve the properties of resistance to cracking, in particular the Fraass breaking point, without damaging the consistency of bitumen/polymer compositions according to the prior art.

Another objective of the invention is to provide a simple process for the preparation of bitumen/polymer compositions, the resistance to cracking of which is improved.

BRIEF DESCRIPTION

According to the invention, the aim of the invention is achieved by a bitumen/polymer composition comprising bitumen, an elastomer and an olefinic polymer adjuvant functionalized by at least glycidyl functional groups. The bitumen comprises at least:

a first bitumen base having an intrinsic stability S of greater than 2.5 and/or a degree of peptization $S_a$ of greater than 0.60, and a second bitumen base having an intrinsic stability S of less than or equal to 2.50 and/or a degree of peptization $5_a$ of less than or equal to 0.60, said values S and $S_a$ being measured according to the standard ASTM D 7157-12.

According to a preferred embodiment, the first bitumen base has an intrinsic stability S of greater than 3.0 and/or a degree of peptization $S_a$ of greater than 0.65 and the second bitumen base has an intrinsic stability S of less than or equal to 3.0 and/or a degree of peptization $S_a$ of less than or equal to 0.65, said values S and $S_a$ being measured according to the standard ASTM D 7157-12.

According to another preferred embodiment, the first bitumen base has an intrinsic stability S of greater than 3.5 and/or a degree of peptization $S_a$ of greater than 0.7 and the second bitumen base has an intrinsic stability S of less than or equal to 3.5 and/or a degree of peptization $S_a$ of less than or equal to 0.70, said values S and $S_a$ being measured according to the standard ASTM D 7157-12.

According to a specific embodiment, the percentage by weight of the second bitumen base, with respect to the total weight of said composition, is less than or equal to 50%, preferably of between 25% and 50% and more preferably between 25% and 40%.

According to another specific embodiment, the first bitumen base is chosen from the residues from the direct and/or vacuum distillation of oil, said residues optionally being blown and/or deasphalted.

According to another preferred embodiment, the first bitumen base is chosen from the residues (VR) from the vacuum distillation of the atmospheric residues originating from the direct distillation of oil. For reasons of simplicity, they are called vacuum residues (VR).

According to another preferred embodiment, the second bitumen base is chosen from the products resulting from the visbreaking of vacuum distillation residues, said vacuum distillation residues (VR) originating from the vacuum distillation of atmospheric residues resulting from the direct distillation of oil. For reasons of simplicity, they are called visbroken vacuum distillation residues.

According to an alternative form, the bitumen/polymer composition comprises between 0.05% and 15% by weight, preferably between 0.1% and 5% by weight and more preferably between 0.1% and 2% by weight of the olefinic polymer adjuvant, with respect to the total weight of said composition.

According to a preferred specific embodiment, the olefinic polymer adjuvant is chosen from the group consisting of:

(a) random or block, preferably random, copolymers of ethylene and of a monomer chosen from glycidyl acrylate and glycidyl methacrylate, comprising from 50% to 99.7% by weight, preferably from 60% to 95% by weight and more preferably from 60% to 90% by weight of ethylene;

(b) random or block, preferably random, terpolymers of ethylene, of a monomer A chosen from vinyl acetate and $C_1$ to $C_6$ alkyl acrylates or methacrylates and of a monomer B chosen from glycidyl acrylate and glycidyl methacrylate, comprising from 0.5% to 40% by weight, preferably from 5% to 35% by weight and more preferably from 10% to 30% by weight of units resulting from the monomer A and from 0.5% to 15% by weight and preferably from 2.5% to 15% by weight of units resulting from the monomer B, the remainder being formed of units resulting from the ethylene; and (c) copolymers resulting from the grafting of a monomer B, chosen from glycidyl acrylate and glycidyl methacrylate, to a substrate consisting of a polymer chosen from polyethylenes, in particular low-density polyethylenes, polypropylenes, random or block, preferably random, copolymers of ethylene and of vinyl acetate and random or block, preferably random, copolymers of ethylene and of $C_1$ to $C_6$ alkyl acrylate or methacrylate, comprising from 40% to 99.7% by weight and preferably from 50% to 99% by weight of ethylene, said grafted copolymers comprising from 0.5% to 15% by weight and preferably from 2.5% to 15% by weight of grafted units resulting from the monomer B.

According to a preferred alternative form, the olefinic polymer adjuvant is chosen from random or block, preferably random, terpolymers of ethylene, of a monomer A chosen from vinyl acetate and $C_1$ to $C_6$ alkyl acrylates or methacrylates and of a monomer B chosen from glycidyl acrylate and glycidyl methacrylate, comprising from 0.5% to 40% by weight, preferably from 5% to 35% by weight and more preferably from 10% to 30% by weight of units resulting from the monomer A and from 0.5% to 15% by weight and preferably from 2.5% to 15% by weight of units resulting from the monomer B, the remainder being formed of units resulting from the ethylene.

Advantageously, the olefinic polymer adjuvant is chosen from random terpolymers of ethylene, of a monomer A chosen from $C_1$ to $C_6$ alkyl acrylates or methacrylates and of a monomer B chosen from glycidyl acrylate and glycidyl methacrylate, comprising from 0.5% to 40% by weight, preferably from 5% to 35% by weight and more preferably from 10% to 30% by weight of units resulting from the monomer A and from 0.5% to 15% by weight and preferably from 2.5% to 15% by weight of units resulting from the monomer B, the remainder being formed of units resulting from the ethylene.

According to a specific embodiment, the bitumen/polymer composition comprises between 0.5% and 10% by weight, preferably between 1% and 6% by weight and more preferably between 1.5% and 4% by weight of elastomer, with respect to the total weight of said composition.

According to a preferred specific embodiment, the elastomer is chosen from random or block copolymers of a monovinylaromatic hydrocarbon and of a conjugated diene.

According to a specific embodiment, the elastomer comprises between 5% and 50% by weight, preferably between 15% and 40% by weight, of monovinylaromatic hydrocarbon.

Advantageously, the elastomer is chosen from random or block copolymers of styrene and of a conjugated diene, preferably butadiene.

According to an alternative foitn, the elastomer is chosen from random or block copolymers of styrene and butadiene including from 50% to 95% and more particularly from 60% to 95% by weight of units resulting from butadiene. In addition, the proportion of units having a 1,2-double bond resulting from the butadiene can advantageously be between 12% and 50%. The elastomer can, for example, be a styrene/butadiene copolymer of high vinyl type, that is to say having a content of 1,2-double bonds resulting from the butadiene of greater than 20% by weight of said copolymer.

According to an alternative form, the weight-average molecular weight of the elastomer is between 10 000 and 600 000 daltons, preferably between 30 000 and 400 000 daltons.

According to a specific embodiment, the elastomer is chosen from sulfur-crosslinkable elastomers.

According to another specific embodiment, the elastomer is chosen from thermally crosslinkable elastomers, that is to say elastomers which can be crosslinked without a crosslinking agent (or chemical coupling agent), it being understood that one and the same elastomer can be both sulfur-crosslinkable and thermally crosslinkable. Mention may be made of the document WO2011013073, cited as example and/or incorporated by reference in the present patent application, which describes a thermal crosslinking process and also thermally crosslinkable elastomers.

According to the invention, the aim of the invention is also achieved by a process for the preparation of a bitumen/polymer composition. The preparation process comprises bringing into contact, the operation being carried out at temperatures of between 100° C. and 200° C., preferably between 150° C. and 200° C. and more preferably between 160° C. and 200° C., and with stirring for a period of time of at least 10 minutes, preferably of between 1 hour and 10 hours and more preferably between 2 hours and 6 hours:

bitumen, between 0.5% and 10% by weight, preferably between 1% and 6% by weight and more preferably between 1.5% and 4% by weight of an elastomer, between 0.05% and 15% by weight, preferably between 0.1% and 5% by weight and more preferably between 0.1% and 2% by weight of an olefinic polymer adjuvant, said bitumen, said elastomer and said olefinie polymer adjuvant being as defined above.

According to one development, the elastomer is chosen from sulfur-crosslinkable elastomers. The process additionally comprises the crosslinking of the elastomer by a sulfur-donating coupling agent added in an amount capable of providing from 0.1% to 20% by weight of free sulfur with respect to the weight of sulfur-crosslinkable elastomer in the bitumen/polymer composition.

Advantageously, the sulfur-donating coupling agent is chosen from the group consisting of elemental sulfur, hydrocarbyl polysulfides, sulfur-donating vulcanization accelerators and the mixtures of such products with one another and/or with non-sulfur-donating vulcanization accelerators.

The invention also relates to the use of a bitumen/polymer composition as described above to prepare a leaktight coating, a membrane or a seal coat.

The aim of the invention is also achieved by a bitumen/polymer binder comprising a bitumen/polymer composition as defined above, In particular, the aim of the invention is achieved by an asphalt comprising a bitumen/polymer binder as described above and inorganic and/or synthetic fillers, such as fines, sand or stone chips.

According to the invention, the aim of the invention is also achieved by a bituminous mix comprising a bitumen/polymer hinder as described above, aggregates and optionally inorganic and/or synthetic fillers, preferably chosen from fines, sand, stone chips or recycled milled products.

The invention also relates to the use of a bitumen/polymer binder as described above to prepare a surface coating, a hot bituminous mix, a cold bituminous mix, a cold-poured bituminous mix, a grave emulsion or a surface course, said binder being combined with aggregates and/or recycled milled products.

DETAILED DESCRIPTION

Other advantages and characteristics will emerge more clearly from the description which will follow, the specific embodiments of the invention of which are given as non-limiting examples.

According to a specific embodiment, a bitumen/polymer composition is prepared by bringing into contact:
bitumen,
between 0.5% and 10% by weight, preferably between 1% and 6% by weight and more preferably between 1.5% and 4% by weight of an elastomer,
between 0.05% and 15% by weight, preferably between 0.1% and 5% by weight and more preferably between 0.1% and 2% by weight of an olefinic polymer adjuvant.

The percentages by weight are calculated with respect to the total weight of said composition. The operation is carried out at temperatures of between 100° C. and 200° C., preferably between 150° C. and 200° C. and more preferably between 160° C. and 200° C., and with stirring for a period of time of at least 10 minutes, preferably of between 1 hour and 10 hours and more preferably between 2 hours and 6 hours.

The applicant company has discovered that the use of a specific bitumen in combination with a specific polymer adjuvant in the preparation of the bitumen/polymer compositions makes it possible to surprisingly improve the properties of resistance to cracking of said bitumen/polymer composition. This is because the applicant company has demonstrated a specific synergistic effect induced by the joint use of a specific bitumen and of a specific polymer adjuvant.

Bitumen is understood to mean a compound formed by one or more bitumen bases.

The bitumen bases according to the present invention are chosen from bitumen bases originating from the refining of crude oil, in particular bitumen bases comprising asphaltenes. The bitumen bases can be obtained by conventional processes for the manufacture of bitumens in a refinery. The bitumen bases corresponding to the residues from the direct distillation and/or to the residues from the vacuum distillation of oil are singled out in particular. It is in particular standard to carry out the vacuum distillation of the atmospheric residues originating from the atmospheric distillation of crude oil. This manufacturing process consequently corresponds to the sequence of an atmospheric distillation and of a vacuum distillation, the feedstock feeding the vacuum distillation corresponding to the atmospheric residue. These vacuum residues resulting from the vacuum distillation tower can also be used as bitumen bases. In addition, these residues can optionally be subjected to other treatments in order to modify their mechanical properties, in particular their consistency. Mention may be made, as example, of the blowing and deasphalting processes widely described in the literature.

Mention may also be made of visbreaking, corresponding to a conversion process which employs thermal cracking reactions without supplying hydrogen. The visbreaking of the residues from the distillation of oil constitutes an additional treatment of these residues capable of providing a bitumen base.

According to a specific form of the invention, the bitumen comprises at least one first bitumen base and at least one second bitumen base, said first and second bitumen bases having different characteristics of stability and/or of aromaticity of the asphaltenes. The bitumen advantageously comprises at least one first bitumen base and one second bitumen base. The bitumen is preferably composed of at least one first bitumen base and one second bitumen base. Use may be made of two or more second bitumen bases. Several first bitumen bases may also be used, in particular in order to adjust the consistency of the bitumen, especially the needle penetrability at 25° C. according to the standard EN1426.

The first and second bitumen bases can be of hard grade or of soft grade. The first and second bitumen bases are advantageously chosen from road bitumens of grades 10/20 to 160/220 and special bitumens of all grades.

In particular, the bitumen according to the invention comprises at least:
a first bitumen base having an intrinsic stability S of greater than 2.5 and/or a degree of peptization $S_a$ of greater than 0.60, and
a second bitumen base having an intrinsic stability S of less than or equal to 2.50 and/or a degree of peptization $S_a$ of less than or equal to 0.60.

Throughout the present patent application, the values S and $S_a$ are measured according to the standard ASTM D 7157-12.

The method for measuring the intrinsic stability according to the standard ASTM D7157-12 quantifies the intrinsic stability S of residues from the distillation of oil comprising asphaltenes. This stability S depends on the aromatic nature of the asphaltenes, indexed by the value $S_a$, and on the aromatic nature of the medium, indexed by the value $S_0$. This method thus makes it possible to characterize the petroleum fractions resulting from the process for the distillation of oil. This method makes it possible in particular to differentiate the residues from the distillation of oil as a function of their intrinsic stability S and of the aromatic nature of the asphaltenes, quantified by the degree of peptization of the asphaltenes $S_a$.

The minimum value of S is 1. This value 1 indicates a high instability, with a strong tendency of the asphaltenes to precipitate. The higher the value of S, the more stable is the bitumen base with a low tendency of the asphaltenes to precipitate.

The value $S_a$ is related to the length and to the number of aromatic chains in the asphaltenes. The higher the value of $S_a$, the more the asphaltenes in the bitumen base can be peptized in a colloidal system.

The bitumen according to the invention comprises, preferably at least:
a first bitumen base having an intrinsic stability S of greater than 2.5 and a degree of peptization $S_a$ of greater than 0.60, and a second bitumen base having an intrinsic stability S of less than or equal to 2.50 and a degree of peptization $S_a$ of less than or equal to 0.60.

According to a preferred alternative form, the first bitumen base has an intrinsic stability S of greater than 3.0 and/or a degree of peptization $S_a$ of greater than 0.65 and the second bitumen base has an intrinsic stability S of less than or equal to 3.0 and/or a degree of peptization $S_a$ of less than or equal to 0.65. Advantageously, the first bitumen base has an intrinsic stability S of greater than 3.0 and a degree of peptization $S_a$ of greater than 0.65 and the second bitumen base has an intrinsic stability S of less than or equal to 3.0 and a degree of peptization $S_a$ of less than or equal to 0.65.

According to another alternative form, the first bitumen base has an intrinsic stability S of greater than 3.5 and/or a degree of peptization $S_a$ of greater than 0.7 and the second bitumen base has an intrinsic stability S of less than or equal to 3.5 and/or a degree of peptization $S_a$ of less than or equal to 0.70. Advantageously, the first bitumen base has an intrinsic stability S of greater than 3.5 and a degree of peptization $S_a$ of greater than 0.7 and the second bitumen base has an intrinsic stability S of less than or equal to 3.5 and a degree of peptization $S_a$ of less than or equal to 0.70.

According to a specific embodiment, the first bitumen base is chosen from the residues from the direct and/or vacuum distillation of oil, said residues optionally being blown and/or deasphalted.

Advantageously, the first bitumen base is chosen from the residues (VR) from the vacuum distillation of the atmospheric residues originating from the direct distillation of oil. According to a specific embodiment, the second bitumen base is preferably chosen from the products resulting from the visbreaking of vacuum distillation residues, said vacuum distillation residues originating from the vacuum distillation of atmospheric residues resulting from the direct distillation of oil.

The visbreaking operations consist in thermally cracking heavy fractions at temperatures of between 450° C. and 460° C., without supplying hydrogen. These products resulting from the visbreaking of vacuum distillation residues comprise asphaltenes which are unstable in the colloidal state compared to conventional bitumens resulting from the direct distillation of oil (atmospheric and/or vacuum). This instability of the asphaltenes is generally reflected by a deterioration in the low-temperature performances. It is also known that the presence of visbroken vacuum distillation residues is responsible for the appearance of chinks, breaks, cracks, fine cracks and/or cuts, in particular in road surfacings using such bitumen bases resulting from visbroken vacuum distillation residues.

The percentage by weight of the second bitumen base, with respect to the total weight of said composition, is advantageously less than or equal to 50%, preferably of between 25% and 50% and more preferably between 25% and 40%.

If the bitumen comprises more than one second base, the percentage by weight is calculated with respect to the sum of the amounts of the second bitumen bases and will preferably not exceed more than 50% by weight, more preferably more than 25% by weight, of the total weight of said bitumen/polymer composition.

The olefinic polymer adjuvant is preferably chosen from the group consisting of (a) ethylene/glycidyl (meth)acrylate copolymers; (b) ethylene/monomer A/monomer B terpolymers and (c) the copolymers resulting from the grafting of a monomer B to a polymer substrate.

(a) The ethylene/glycidyl (meth)acrylate copolymers are advantageously chosen from random or block, preferably random, copolymers of ethylene and of a monomer chosen from glycidyl acrylate and glycidyl methacrylate, comprising from 50% to 99.7% by weight, preferably from 60% to 95% by weight and more preferably from 60% to 90% by weight of ethylene.

(b) The terpolymers are advantageously chosen from random or block, preferably block, terpolymers of ethylene, of a monomer A and of a monomer B.

The monomer A is chosen from vinyl acetate and $C_1$ to $C_6$ alkyl acrylates or methacrylates.

The monomer B is chosen from glycidyl acrylate and glycidyl methacrylate.

The ethylene/monomer A/monomer B terpolymers comprise from 0.5% to 40% by weight, preferably from 5% to 35% by weight and more preferably from 10% to 30% by weight of units resulting from the monomer A and from 0.5% to 15% by weight and preferably from 2.5% to 15% by weight of units resulting from the monomer B, the remainder being formed of units resulting from the ethylene.

(c) The copolymers result from the grafting of a monomer B chosen from glycidyl acrylate and glycidyl methacrylate to a polymer substrate. The polymer substrate consists of a polymer chosen from polyethylenes, in particular low-density polyethylenes, polypropylenes, random or block, preferably random, copolymers of ethylene and of vinyl acetate and random or block, preferably random, copolymers of ethylene and of $C_1$ to $C_6$ alkyl acrylate or methacrylate, comprising from 40% to 99.7% by weight and preferably from 50% to 99% by weight of ethylene. Said grafted copolymers comprise from 0.5% to 15% by weight, preferably from 2.5% to 15% by weight, of grafted units resulting from the monomer B. The olefinic polymer adjuvant is preferably chosen from the ethylene/monomer A/monomer B terpolymers (b) described above.

Advantageously, the olefinic polymer adjuvant is chosen from random terpolymers of ethylene, of a monomer A chosen from $C_1$ to $C_6$ alkyl acrylates or methacrylates and of a monomer B chosen from glycidyl acrylate and glycidyl methacrylate, comprising from 0.5% to 40% by weight, preferably from 5% to 35% by weight and more preferably from 10% to 30% by weight of units resulting from the monomer A and from 0.5% to 15% by weight and preferably from 2.5% to 15% by weight of units resulting from the monomer B, the remainder being formed of units resulting from the ethylene.

The elastomer can be chosen from polybutadiene, polyisoprene, polychloroprene, butadiene/isoprene copolymers, polynorbornene, polyisobutylene, butyl rubber, high-density polyethylene, low-density polyethylene, polypropylene, polybutene, ethylene/propylene random copolymers (EP), ethylene/propylene/diene random terpolymers (EPDM), ethylene/styrene copolymers or ethylene/butene/styrene copolymers.

The elastomer is advantageously chosen from random or block copolymers of a monovinylaromatic hydrocarbon and of a conjugated diene.

The elastomer preferably comprises between 5% and 50% by weight and more preferably between 15% and 40% by weight of monovinylaromatic hydrocarbon.

The elastomer is advantageously chosen from random or block copolymers of styrene and of a conjugated diene.

The weight-average molecular weight of the elastomer is advantageously between 10 000 and 600 000 daltons, preferably between 30 000 and 400 000 daltons.

The elastomer is advantageously chosen from random or block copolymers of styrene and of a conjugated diene, such as butadiene, isoprene, chloroprene, carboxylated butadiene or carboxylated isoprene. Random or block copolymers of styrene and butadiene will preferably be chosen.

The elastomer can consist of one or more copolymers chosen from block copolymers, with or without a random hinge, of styrene and butadiene, of styrene and isoprene, of styrene and chloroprene, of styrene and carboxylated butadiene or of styrene and carboxylated isoprene.

Preferably, the copolymer of styrene and of conjugated diene is chosen from di- or triblock copolymers of styrene and butadiene, of styrene and isoprene, of styrene and carboxylated butadiene or of styrene and carboxylated isoprene which have styrene contents and weight-average molecular weights lying within the ranges defined above.

According to a specific embodiment, the composition is a bitumen/crosslinked polymer composition.

The elastomer is chosen from sulfur-crosslinkable elastomers. The sulfur-crosslinkable elastomer used to prepare bitumen/polymer compositions is re-encountered crosslinked in said compositions. The manufacturing process consequently comprises an additional crosslinking stage involving a sulfur-donating coupling agent. The composition then comprises a sulfur-donating coupling agent in an amount capable of providing a free amount of sulfur. The amount of sulfur generally represents from 0.1% to 20% by weight and preferably from 1% to 10% by weight of the sulfur-crosslinkable elastomer in the bitumen/polymer composition.

According to a specific embodiment, the process for the manufacture of the bitumen/crosslinked polymer composition comprises, for example, the following successive stages:

the bitumen, a sulfur-crosslinkable elastomer and the olefinic polymer adjuvant are introduced into a reactor, the mixture is stirred until a homogeneous mixture is obtained and is heated at a temperature of between 100° C. and 200° C., preferably between 150° C. and 200° C. and more preferably between 160° C. and 200° C., for a period of time of at least 10 minutes, preferably between 1 hour and 10 hours and more preferably between 2 hours and 6 hours, a sulfur-donating coupling agent is subsequently added in an amount capable of providing a free amount of sulfur representing from 0.5% to 10% by weight, preferably from 1% to 6% by weight and more preferably from 2% to 5% by weight of the sulfur-crosslinkable elastomer in said composition, the reaction medium thus obtained is heated with stirring at a temperature of between 100° C. and 200° C., preferably between 150° C. and 200° C. and more preferably between 160° C. and 200° C., for a period of time of at least 10 minutes, preferably between 10 minutes and 4 hours and more preferably between 10 minutes and 2 hours.

In the implementation described above, the olefinic polymer adjuvant can be incorporated in the bitumen before or after the sulfur-crosslinkable elastomer, it also being possible for a simultaneous incorporation to be envisaged.

According to an alternative form, the elastomer is chosen from thermally crosslinkable elastomers, for example the high-vinyl styrene/butadiene copolymers described above. The process for the manufacture of the bitumen/crosslinked polymer composition then employs a stage of thermal crosslinking of the elastomer, as described, for example, in the document WO2011013073. No chemical coupling agent is used.

According to a specific embodiment, it is also possible to introduce an agent capable of trapping the hydrogen sulfide ($H_2S$) liable to be released during the crosslinking of the bitumen/polymer composition. This agent is known under the name of $H_2S$ scavenger. The $H_2S$ scavenger is preferably added after the coupling agent in order to decrease or eliminate releases of $H_2S$. It is possible to add, to the reaction medium, from 0.05% to 2% by weight, preferably from 0.1% to 1% by weight, of $H_2S$ scavenger, the percentage being calculated with respect to the total amount of the bitumen/polymer composition. After addition of the $H_2S$ scavenger, the reaction medium is kept stirred for at least 10 minutes, generally between 10 minutes and 1 hour.

The sulfur-donating coupling agents which can be used are of very varied nature and are chosen as a function of the elastomer to be crosslinked in the bitumen/polymer composition according to the invention.

The sulfur-donating coupling agent is advantageously chosen from the group formed by elemental sulfur, hydrocarbyl polysulfides, sulfur-donating vulcanization accelerators and the mixtures of such products with one another and/or with non-sulfur-donating vulcanization accelerators.

The vulcanization accelerators are either hydrocarbyl polysulfides or sulfur-donating vulcanization accelerators or non-sulfur-donating vulcanization accelerators. The hydrocarbyl polysulfides can be chosen from those which are defined in the patent FR 2 528 439 cited as example and/or incorporated by reference in the present patent application. The sulfur-donating vulcanization accelerators can be chosen from thiuram polysulfides, such as, for example, tetrabutylthiuram disulfides, tetraethylthiuram disulfides and tetramethylthiuram disulfides. The non-sulfur-donating vulcanization accelerators which can be used can be sulfur-comprising compounds chosen in particular from mercaptobenzothiazole and its derivatives, dithiocarbamates and its derivatives and monosulfides of thiuram and its derivatives.

Mention may be made, for example, of zinc 2-mercaptobenzothiazole, zinc dibutyldithiocarbamate or tetramethylthiuram monosulfide. For further details with regard to the sulfur-donating and non-sulfur-donating vulcanization accelerators which can be used according to the invention, reference may be made to the patents EP 0 360 656, EP 0 409 683 and FR 2 528 439 cited as example and/or incorporated by reference in the present patent application.

Adhesion agents and/or surface-active agents can also be added to the bitumen/polymer composition. They are generally chosen from alkylamine derivatives, alkylpolyamine derivatives, alkylamidopolyamine derivatives, alkylamidopolyamine derivatives and derivatives of quaternary ammonium salts, taken alone or as a mixture. The amount of adhesion agents and/or surface-active agents in the bitumen/polymer composition is, for example, between 0.2% and 2% by weight, preferably between 0.5% and 1% by weight, with respect to the total weight of the bitumen/polymer composition.

The order of introduction of the different constituents does not influence the mechanical and/or dynamic properties of the bitumen/polymer composition thus obtained.

In particular, the olefinic polymer adjuvant is incorporated in the bitumen before or after the elastomer.

Various uses of the bitumen/polymer compositions obtained according to the invention are envisaged. In particular, the bitumen/polymer compositions can be used in the preparation of a bitumen/polymer binder.

According to a specific embodiment, a bitumen/polymer binder comprises a bitumen/polymer composition as described above.

The bitumen/polymer binder according to the invention can in its turn be employed to prepare a combination with aggregates, in particular road aggregates.

As regards the road applications, the invention is targeted in particular at bituminous mixes as materials for the construction and the maintenance of road foundations and their surfacing, and also in carrying out all road works.

Bituminous mix is understood to mean a mixture of a bituminous binder with aggregates and optionally inorganic and/or synthetic fillers.

The bituminous mix comprises a bituminous binder as described above and optionally inorganic and/or synthetic fillers, preferably chosen from fines, sand, stone chips and recycled milled products. The aggregates are inorganic and/or synthetic aggregates, in particular recycled milled products, with dimensions of greater than 2 mm, preferably of between 2 mm and 20 mm.

The bitumen/polymer binder described above can advantageously be used to prepare a surface coating, a hot bituminous mix, a cold bituminous mix, a cold-poured bituminous mix or a grave emulsion.

As regards the road applications, the invention is also targeted at asphalts as materials for constructing and covering sidewalks.

Asphalt is understood to mean a mixture of bituminous binder with inorganic and/or synthetic fillers.

An asphalt comprises a bituminous binder as described above and inorganic fillers, such as fines, sand or stone chips, and/or synthetic fillers. The inorganic fillers are composed of fines (particles with dimensions of less than 0.063 mm), of sand (particles with dimensions of between 0.063 mm and 2 mm) and optionally of stone chips (particles with dimensions of greater than 2 mm, preferably of between 2 mm and 4 mm)

The asphalts exhibit 100% compactness and are mainly used to construct and cover sidewalks, whereas the bituminous mixes have a compactness of less than 100% and are used to construct roads. Unlike the bituminous mixes, the asphalts are not compacted with a roller when being put in place.

Another aspect of the invention is the use of a bitumen/polymer composition in various industrial applications, in particular for preparing a leaktight coating, a membrane or a seal coat.

As regards the industrial applications of the bituminous compositions, mention may be made of the manufacture of leaktight membranes, of noise-reduction membranes, of insulating membranes, of surface coatings, of carpet tiles or of seal coats.

EXAMPLES

For the record, throughout the present patent application, the following properties of the bitumens are measured as shown in table 1 below:

TABLE 1

| Property | Abbreviatio | Unit | Measurement standard |
|---|---|---|---|
| Needle penetrability at 25° C. | P25 | 1/10 mm | EN 1426 |
| Ring-and-ball softening temperature | RBT | ° C. | EN 1427 |
| Fraass breaking point | Fraass | ° C. | EN 12593 |
| Elastic recovery at 25° C. | R25 | % | EN 13398 |
| Tensile test, 5° C., 100 mm/min | ε max | % | EN 13587 |

TABLE 1-continued

| Property | Abbreviatio | Unit | Measurement standard |
|---|---|---|---|
| Intrinsic stability of the asphaltenes | | | ASTM D 7157-12 |
| Intrinsic stability | S | — | |
| Degree of peptization (solubility) of the asphaltenes | $S_a$ | — | |
| Degree of peptization | $S_0$ | — | |

Bitumen Bases

Two types of bitumen bases are used: two bitumen bases resulting from vacuum residues from the direct distillation of crude oil (VR) and a bitumen base resulting from visbroken residues from the vacuum distillation of crude oil.

Bitumen bases resulting from direct distillation vacuum residues (VR): $B_{\alpha 1}$ and $B_{\alpha 2}$ Bitumen base, denoted $B_{\alpha 1}$, corresponding to a bitumen of 10/20 grade and with a P25 of 12 1/10 mm.

Bitumen base, denoted $B_{\alpha 2}$, corresponding to a bitumen of 160/220 grade and with a P25 of 175 1/10 mm.

Bitumen base resulting from visbroken vacuum distillation residues (visbroken VR): $B_{\beta 1}$ Bitumen base, denoted $B_{\beta 1}$, corresponding to a visbroken VR (CAS 92062-05-0, EINECS 295-518-9) with a P25 of 56 1/10 mm.

Mixtures of Bitumen Bases $B_{\alpha 3}$ and $\beta_{\beta 2}$

Mixture of bitumen bases, denoted $B_{\alpha 3}$, corresponding to a mixture of the two bitumen bases $B_{\alpha 1}$ and $B_{\beta 2}$ (VR) in proportions adjusted so as to obtain a bituminous composition with a P25 of 36 1/10 mm.

Mixture of bitumen bases, denoted $B_{\beta 2}$, corresponding to a mixture of the two bitumen bases $B_{\alpha 1}$ and $B_{\alpha 2}$ (VR) and of a bitumen base $B_{\beta 1}$ (visbroken VR) in proportions adjusted so as to obtain a bituminous composition having a penetrability P25 comparable to that containing the base $B_{\alpha 3}$, i.e. a measured P25 of 42 1/10 mm (equivalent penetrability).

Properties of the Bitumen Bases

The intrinsic stability of the bitumen bases and of the mixture of bitumen bases was measured according to the standard ASTM D7157-12.

The intrinsic stability values of the bitumen bases and of the mixture of bitumen bases are listed in the following table 2:

TABLE 2

| | | $B_{\alpha 1}$ | $B_{\alpha 2}$ | $B_{\alpha 3}$ | $B_{\beta 1}$ |
|---|---|---|---|---|---|
| weight % $B_{\alpha 1}$ | | 100 | | 59 | |
| weight % $B_{\alpha 2}$ | | | 100 | 41 | |
| weight % $B_{\beta 1}$ | | | | | 100 |
| Intrinsic stability | $S_a$ | 0.73 | 0.77 | 0.75 | 0.55 |
| ASTM D7157-12 | $S_0$ | 1.14 | 1.05 | 1.10 | 0.89 |
| | S | 4.22 | 4.48 | 4.33 | 1.98 |

The bitumen base $B_{\beta 1}$ (visbroken VR) is distinguished from the bases $B_{\alpha 1}$ and $B_{\alpha 2}$ (VR) and from the mixture of bitumen bases $B_{\alpha 3}$ (VR) by a lower intrinsic stability S (1.98) and a smaller value of the degree of peptization of the asphaltenes $S_a$ (0.55).

In particular, the bitumen base $B_{\beta 1}$ (visbroken VR) has an S value of less than 3 and an $S_a$ value of less than 0.65, whereas the bases $B_{\alpha 1}$, $B_{\alpha 2}$ and $B_{\alpha 3}$ (VR) have an S value of greater than 3 and an $S_a$ value of greater than 0.65.

The mechanical and elastic properties of the bitumen bases and of the mixtures of bitumen bases were evaluated. The results are listed in the following table 3:

TABLE 3

|  | $B_{\alpha 1}$ | $B_{\alpha 2}$ | $B_{\alpha 3}$ | $B_{\beta 1}$ | $B_{\beta 2}$ |
|---|---|---|---|---|---|
| weight % $B_{\alpha 1}$ | 100 |  | 59 |  | 39 |
| weight % $B_{\alpha 2}$ |  | 100 | 41 |  | 36 |
| weight % $B_{\beta 1}$ |  |  |  | 100 | 25 |
| P25 (1/10 mm) | 12 | 171 | 42 | 56 | 39 |
| RBT (° C.) | 63.4 | 39 | 53.6 | 50.6 | 52.6 |
| Fraass (° C.) | −8 | −16 | −9 | −10 | −7 |
| ε max (%) | breaking | breaking | breaking | breaking | breaking |

The Fraass breaking point is an indicator which makes it possible to characterize the low-temperature brittleness of the bitumen. The higher the Fraass breaking point, the more brittle the bitumen, that is to say the greater the risk of appearance of cracks under cold conditions.

The results of table 3 show that, at equivalent penetrability P25, the difference between the Fraass value for $B_{\alpha 3}$ and that for $B_{\beta 2}$ is not very significant. By adding 25% by weight of a bitumen base $B_{\beta 1}$ having an intrinsic stability S equal to 1.98 (less than 3) and a degree of peptization $S_a$ of 0.55 (less than 0.65) to the mixture of bitumen bases $B_{\alpha 3}$ having an intrinsic stability of 4.33 (greater than 3) and a degree of peptization $S_a$ of 0.75 (greater than 0.65), it is found that the variation in the Fraass breaking point is low (Δ=2° C.). This variation is not significant insofar as it is close to the delta of values of the repeatability of the EN 12593 method.

Polymer Adjuvant

Ethylene/butyl acrylate/glycidyl methacrylate terpolymer in proportions by weight respectively of 70/21/9 and having a melt flow rate (MFR) (190° C./2.16 kg) of 8 g/10 min, calculated according to the standard ASTM D1238-ISO1133.

Elastomer

Styrene/butadiene/styrene block copolymer, comprising 30.5% by weight of styrene and comprising 69.5% by weight of butadiene. The content of 1,2-vinyl groups is 27.8% by weight, with respect to the total weight of copolymer. The copolymer has a weight-average molecular weight (Mw) of 142 500 daltons and a polydispersity index $I_p$ of 1.09.

Preparation of the Bitumen/Polymer Compositions

Example 1 (Control)

Preparation of a Bitumen/Polymer Composition $C^C_{\beta 25}$ including a Sulfur-crosslinked Elastomer without Polymer Adjuvant The following are introduced into the reactor:
  38.6% by weight of the bitumen $B_{\alpha 1}$
  34.7% by weight of the bitumen $B_{\alpha 2}$
  24.1% by weight of the bitumen $B_{\beta 1}$
  2.5% by weight of the elastomer.

The mixture is stirred at high intensity, that is to say at a high shear rate, in order to obtain a mixture which is homogeneous at the micron scale, and is heated at 185° C. for approximately 4 hours.

0.1% by weight of sulfur (flowers of sulfur) is subsequently added.

The mixture is stirred at low intensity and is heated at 185° C. for 2 hours.

Example 2

Preparation of a Bitumen/Polymer Composition $C_{\beta 25}$ Including a Sulfur-crosslinked Elastomer and a Polymer Adjuvant The bitumen/polymer composition $C_{\beta 25}$ is produced according to the same preparation process as example 1, except that a polymer adjuvant is added. The proportions of the different constituents are as follows:
  40% by weight of the bitumen base $B_{\alpha 1}$
  32.95% by weight of the bitumen base $B_{\alpha 2}$
  24.2% by weight of the bitumen base $B_{\beta 1}$
  2.5% by weight of the elastomer
  0.25% by weight of the polymer adjuvant
  0.1% by weight of sulfur.

Example 3

Preparation of a Bitumen/Polymer Composition $C_{\beta 50}$ Including a Sulfur-crosslinked Elastomer and a Polymer Adjuvant The bitumen/polymer composition $C_{\beta 50}$ is produced according to the same preparation process as example 2, except for the amount of bitumen base $B_{\beta 1}$ added. The proportions of the different constituents are as follows:
  28.65% by weight of the bitumen base $B_{\alpha 1}$
  20% by weight of the bitumen base $B_{\alpha 2}$
  48.5% by weight of the bitumen base $B_{\beta 1}$
  2.5% by weight of the elastomer
  0.25% by weight of the polymer adjuvant
  0.1% by weight of sulfur.

Example 4 (Control)

Preparation of a Bitumen/Polymer Composition $C^C_{\beta 0}$ Including a Sulfur-crosslinked Elastomer and a Polymer Adjuvant The bitumen/polymer composition $C^C_{\beta 0}$ is produced according to the same preparation process as example 2, except that bitumen base $B_{\beta 1}$ is not used. The proportions of the different constituents are as follows:
  50.5% by weight of the bitumen $B_{\alpha 1}$
  46.65% by weight of the bitumen $B_{\alpha 2}$
  2.5% by weight of the elastomer
  0.25% by weight of the polymer adjuvant
  0.1% by weight of sulfur.

Properties of the Bitumen/Polymer Compositions

The characteristics of the different bitumen/polymer compositions, measured according to the abovementioned standards, are recorded in the following table 4:

TABLE 4

| Bitumen/polymer composition | $C^C_{\beta 0}$ | $C^C_{\beta 25}$ | $C_{\beta 25}$ | $C_{\beta 50}$ |
|---|---|---|---|---|
| weight % $B_{\beta 1}$ | 0 | 24.1 | 24.2 | 48.5 |
| weight % of the polymer adjuvant | 0.25 | 0 | 0.25 | 0.25 |
| P25 (1/10 mm) | 32 | 35 | 35 | 35 |
| RBT (° C.) | 63.4 | 58.4 | 62.5 | 64 |
| Fraass (° C.) | −9 | −10 | −16 | −13 |
| R25 (%) | 75 | 73 | 80.5 | 77 |
| ε max (%) | 640 | 693 | 680 | breaking |

By comparison of the Fraass results of the $C^C_{\beta 0}$ and of the $B_{\alpha 3}$, it is found that the addition of the polymer adjuvant does not bring about any variation in the Fraass point ($\Delta_1$=Fraass $B_{\alpha 3}(-9)$–Fraass $C^C_{\beta 0}(-9)=0°$ C.).

By comparison of the Fraass results of the $C^C_{\beta 25}$ and of the $B_{\beta 2}$, a decrease of 3° C. in the Fraass is observed due to the presence of the crosslinked elastomer in the bitumen ($\Delta_2$=Fraass $B_{\beta 2}(-7)$–Fraass $C^C_{\beta 25}(-10)=3°$ C.).

By comparison of the Fraass results of the $C_{\beta 25}$ and of the $B_{\beta 2}$, a decrease in the Fraass of 9° C. is observed ($\Delta_3$=Fraass $B_{\beta 2}(-7)$–Fraass $C_{\beta 25}(-16)=9°$ C.).

The addition independently either of the bitumen base $B_{\beta 1}$ or of the polymer adjuvant does not significantly modify the Fraass value of a bitumen/crosslinked polymer composition. Fraass values respectively of −9° C. and −10° C. are obtained for the bitumen/crosslinked polymer compositions $C^C_{\beta 0}$ and $C^C_{\beta 25}$.

On the other hand, surprisingly, it is found that the addition of a combination of the bitumen base $B_{\beta 1}$ and of the polymer adjuvant significantly improves the Fraass of a bitumen/crosslinked polymer composition, in particular for a concentration by weight of bitumen base $B_{\beta 1}$ of less than or equal to 50%. For example, a Fraass value of −16° C. is achieved for the bitumen/crosslinked polymer composition $C_{\beta 25}$. The difference in Fraass $\Delta_3$ (9° C.) is far greater than the sum of the differences $\Delta_1+\Delta_2$ (3° C.). There thus exists a synergistic effect of the bitumen base $B_{\beta 1}$ (visbroken VR) with the polymer adjuvant which makes it possible to improve the low-temperature mechanical properties, in particular the Fraass.

Without being committed to this theory, it would appear that the olefinic polymer adjuvant interacts with the second bitumen base so as to improve the consistency, while avoiding the problems of cracking inherent in the presence of a bitumen base having a high content of asphaltenes, in particular exhibiting an instability of the asphaltenes. In particular, this synergy makes it possible to improve the low-temperature mechanical properties without damaging the other mechanical and elastic properties, in particular the RBT and the P25.

The invention claimed is:

1. A bitumen/polymer composition comprising:
   bitumen,
   an elastomer selected from the group consisting of random copolymers and block copolymers of styrene and of a conjugated diene,
   a sulfur-donating coupling agent, and
   between 0.05% and 15% by weight of an olefinic polymer adjuvant selected from the group consisting of random terpolymers and block terpolymers of ethylene, of a monomer A chosen from vinyl acetate and $C_1$ to $C_6$ alkyl acrylates or methacrylates, and of a monomer B chosen from glycidyl acrylate and glycidyl methacrylate, comprising from 0.5% to 40% by weight of units resulting from the monomer A and from 0.5% to 15% by weight of units resulting from the monomer B, the remainder being formed of units resulting from the ethylene,
   wherein the bitumen comprises at least:
      at least one first bitumen base having an intrinsic stability S of greater than 4.0 and a degree of peptization $S_a$ of greater than 0.70, and
      from 24% to less than or equal to 50% by weight of at least one second bitumen base having an intrinsic stability S of less than or equal to 2.50 and a degree of peptization $S_a$ of less than or equal to 0.60,
   the percentages being given by weight with respect to a total weight of the composition and said values S and $S_a$ being measured according to the standard ASTM D 7157-12.

2. The composition as claimed in claim 1, wherein the percentage by weight of the second bitumen base, with respect to the total weight of said composition, is between 25% and 40%.

3. The composition as claimed in claim 1, wherein the first bitumen base is chosen from residues from the direct distillation of oil, and residues from the vacuum distillation of oil.

4. The composition as claimed in claim 3, wherein said residues have been blown, or deasphalted, or blown and deasphalted.

5. The composition as claimed in claim 3, wherein the first bitumen base is chosen from the residues (VR) from the vacuum distillation of the atmospheric residues originating from the direct distillation of oil.

6. The composition as claimed in claim 1, wherein the second bitumen base is chosen from the products resulting from the visbreaking of vacuum distillation residues (visbroken VR), said vacuum distillation residues (VR) originating from the vacuum distillation of atmospheric residues resulting from the direct distillation of oil.

7. The composition as claimed in claim 1, wherein the olefinic polymer adjuvant is chosen from random terpolymers of ethylene, of a monomer A chosen from $C_1$ to $C_6$ alkyl acrylates or methacrylates and of a monomer B chosen from glycidyl acrylate and glycidyl methacrylate, comprising from 0.5% to 40% by weight of units resulting from the monomer A and from 0.5% to 15% by weight of units resulting from the monomer B, the remainder being formed of units resulting from the ethylene.

8. The composition as claimed in claim 1, wherein it comprises between 0.5% and 10% by weight of elastomer, with respect to the total weight of said composition.

9. The composition as claimed in claim 8, wherein the elastomer comprises between 5% and 50% by weight of monovinylaromatic hydrocarbon.

10. A process for the preparation of a bitumen/polymer composition according to claim 1, said process comprising:
    bringing into contact, at temperatures of between 100° C. and 200° C. and with stirring for a period of time of at least 10 minutes:
       bitumen,
       between 0.5% and 10% by weight of an elastomer,
       between 0.05% and 15% by weight of an olefinic polymer adjuvant, and
    crosslinking the elastomer by a sulfur-donating coupling agent added in an amount capable of providing from 0.1% to 20% by weight of free sulfur with respect to the weight of sulfur-crosslinkable elastomer in said composition.

11. The process as claimed in claim 10, wherein the sulfur-donating coupling agent is chosen from the group consisting of elemental sulfur, hydrocarbyl polysulfides, sulfur-donating vulcanization accelerators and the mixtures of such products with one another and/or with non-sulfur-donating vulcanization accelerators.

12. A bituminous composition comprising a bitumen/polymer composition as claimed in claim 1, wherein said bituminous composition is a leaktight coating, a membrane or a seal coat.

13. A bituminous composition comprising a bitumen/polymer composition as claimed in claim 1, wherein said bituminous composition is a bituminous binder, as asphalt or a bituminous mix.

\* \* \* \* \*